Patented Apr. 12, 1949

2,466,694

UNITED STATES PATENT OFFICE 2,466,694

POLYMERIZATION OF OLEFINS IN THE PRESENCE OF ALKALI AND ALKALINE EARTH METAL CATALYSTS

William V. Freed, Wilmington, Del., assignor to E. I. du Pont de Nemours & Company, Wilmington, Del., a corporation of Delaware No Drawing. Application December 30, 1946, Serial No. 719,339

7 Claims. (Cl. 260—683.15)

This invention relates to a catalytic process and more particularly to a catalytic synthesis of olefins. More specifically this invention relates to a process for the intermolecular condensation of two or more different open-chain gaseous monoolefins to produce liquid monoolefinic hydrocarbons.

It is known that gaseous olefins can be converted to liquid olefin mixtures by polymerization at elevated temperatures and superatmospheric pressures with or without catalysts. However, these methods of operation result in complex olefinic mixtures with polymers of one or another of the reactants formed as the major products.

It is an object of this invention to provide a process for reacting two different normally gaseous monoolefins to yield low molecular weight inter-condensation liquid products. A further object is to provide an efficient catalytic method for the intermolecular condensation of two or more different normally gaseous open-chain monoolefins to produce liquid monoolefinic hydrocarbons of relatively low molecular weight. Other objects will appear hereinafter.

These objects are accomplished by the following invention which comprises heating two or more different normally gaseous open-chain monoolefin hydrocarbons at a temperature of at least 275° C., under pressure above 250 atmospheres in the presence of an alkali metal or alkaline earth metal catalyst to form low molecular weight normally liquid open-chain monoolefin hydrocarbons. It has been discovered that the temperature and pressure conditions are critical and that it is necessary to employ a temperature of at least 275° C., under a pressure above 250 atmospheres to obtain inter-condensation between the two different normally gaseous open-chain monoolefin hydrocarbons and production of low molecular weight normally liquid open-chain monoolefin hydrocarbons.

In the practice of this invention, low molecular weight liquid monoolefin hydrocarbons are produced by reacting two or more different normally gaseous open-chain monoolefin hydrocarbons over an alkali metal or alkaline earth metal, such as metallic sodium, and under superatmospheric pressure above 250 atmospheres at a temperature between 275° and about 400° C. The upper limit of temperature at which the reaction can be carried out is determined by the thermal stability of the monoolefin in the presence of the alkali metal. However, excessively high temperatures favor the formation of complex hydrocarbon polymers at the expense of the lower molecular weight condensation products. The preferred embodiment of this invention involves the use of temperatures above 275° C. and up to about 325° C. under superatmosphere pressure of at least 400 atmospheres.

Generally pressures in the range of about 500 to 1000 atmospheres are employed, however, since under these conditions a most satisfactory reaction rate is obtained. The upper pressure limit will depend upon the practical limitations of the reaction vessel.

It is desirable to agitate and heat during the period of smooth gas absorption but to discontinue heating when there is a definite decrease in the rate of gas absorption. By adjusting the length of time of reaction to the period during which gas absorption occurs, secondary reactions between the liquid products formed and the gaseous olefins will be diminished. A reaction time within the range of 4 to 15 hours is preferred in practicing this invention. Prolonged overheating of the liquid products tends to form complex polymeric mixtures of high boiling hydrocarbons.

As catalyst for the process of this invention, the alkali metals and alkaline earth metals of groups I and II of the periodic table can be employed. The alkali metals or alkaline earth metals may be employed alone in molten form or in a finely divided metallic form. Suitable catalysts can be prepared from combinations or alloys of the alkali metal and alkaline earth metals. Finely divided alkali or alkaline earth metals can be used alone or supported on porous carriers, such as silica, alumina, kieselguhr, pumice, carbon and the like. The catalysts are used in amounts ranging from 3 to 15 parts by weight of the higher molecular weight monoolefin employed as starting material. In general, metallic sodium and potassium are preferred in the process of this invention owing to their low melting point, outstanding activity, and lack of tendency to promote polymerization of one or the other of the normally gaseous open-chain monoolefin hydrocarbons under the conditions of the process of this invention.

The following examples illustrate the process of this invention and demonstrate preferred conditions for the catalytic inter-condensation of normally gaseous open-chain monoolefins. Unless otherwise stated, quantities are expressed as parts by weight.

Example I

Eight parts of metallic sodium in chunk form was charged into a high pressure reaction tube provided with a device to agitate the contents vigorously. The tube was evacuated and 85 parts of propylene was added. Ethylene was injected to a pressure of about 50 atms. and the tube heated to 300° C. The total ethylene pressure was then raised to 500 atms. During a period of 4 hours ethylene was absorbed smoothly as evidenced by a total pressure drop of 650 atms. Ethylene pressure was maintained between 400 and 500 atms. by occasional repressuring. When no further ethylene absorption occurred, the reaction tube was cooled and the crude reaction product was discharged.

The liquid alkylation product was separated from 38 parts of a mixture of small sodium pellets and black solid residue, and consisted of 100 parts of an oily liquid. The liquid product was fractionally distilled through a 26" by ½" still packed with glass helices. From 85 parts propylene the following was obtained: Fraction I, pentene, boiling range 32–40° C., $n_D^{20}$, 1.3792, 26 parts; Fraction II, boiling range 40–85° C., 3.5 parts; Fraction III, heptylene, 85–100° C., $n_D^{20}$, 1.4070, 20.2 parts, and high boiling residue, 50 parts. Based on propylene this represents an 18.6% conversion to pentene and 11% conversion to heptylene. The total liquid alkylate consisted of 26% pentene, 20% heptylene, and 50% high boiling material.

Example II

Eight parts of sodium and 84 parts of isobutylene were charged into a pressure reaction tube and heated at 310° C. under 500 atms. ethylene pressure for 4 hours. During this period there was a total of 275 atms. ethylene absorption and 130 parts of liquid condensation product was obtained. Distillation gave 17 parts of hexene, boiling range 57–75° C., $n_D^{20}$, 1.3930 which represents a 15% conversion based on isobutylene. The remainder of the liquid product was higher boiling residue.

Example III

Eight parts of sodium and 84 parts of isobutylene were charged into a reaction tube and heated at 300° C. under 500 atms. propylene pressure. Over a period of 4 hours there was a total propylene pressure drop of 400 atms. giving 103 parts of liquid product. Fractional distillation gave 34 parts heptylene, $n_D^{26}$, 1.3970, boiling range 70–85° C., representing a 24% conversion based on isobutylene.

Example IV

In a reaction similar to that of Example I using 8 parts of potassium metal and 85 parts of propylene at 300° C. and 500 atms. ethylene pressure, there was a total ethylene pressure drop of 550 atms. over a period of 9 hours. There was produced 110 parts of a liquid product consisting of 15% amylene, 30% heptylene, and 50% high boiling material.

The process of this invention is applicable to any two or more different normally gaseous open-chain monoolefin hydrocarbons containing not more than 4 carbon atoms. Typical examples of normally gaseous open-chain monoolefin hydrocarbons are ethylene, propylene, isobutylene, butene-1, and butene-2, which undergo intermolecular condensation in this reaction to form low molecular weight normally liquid open-chain monoolefin hydrocarbons of the general formula $C_nH_{2n}$ in which $n$ is a whole number less than ten. In the reaction of an odd with an even numbered normally gaseous, open-chain monoolefin hydrocarbon an odd numbered low molecular weight normally liquid open-chain monoolefin hydrocarbon is produced.

The alkylation reaction of this invention, which employs alkali and alkaline earth metals as catalysts, provides a means for obtaining normally liquid low molecular weight monoolefin hydrocarbons useful as fuels in internal combustion engines. These catalysts avoid the corrosion problems inherent in the acidic alkylation catalysts previously used.

The low molecular weight monoolefin hydrocarbons produced by this invention comprise a valuable class of hydrocarbons which are particularly useful in the synthetic fuel industry as premium motor fuels. These materials can be used alone as motor fuels possessing high anti-knock values or as blending agents for improving the anti-knock values and oxidation stability of standard gasoline fractions. Thus the octane numbers of $C_6$ and $C_8$ olefins are 80 and 82.5 respectively as determined by the ASTM method D—357—48. The products of this invention also have wide utility as solvents for coating compositions, insecticides, and dyestuffs and as chemical intermediates in reactions based on specific monoolefin fractions.

As many apparently widely different embodiments of this invention may be made without departing from the spirit and scope thereof, it is to be understood that the invention is not limited to the specific embodiments thereof except as defined in the appended claims.

I claim:

1. A process for the inter-condensation of at least two different normally gaseous open-chain monoolefin hydrocarbons into low molecular weight normally liquid open-chain monoolefin hydrocarbons containing less than 10 carbon atoms which comprises heating at least two different normally gaseous open-chain monoolefin hydrocarbons at a temperature between 275° and 400° C., under a pressure between 250 and 1000 atms. in the presence of a catalyst selected from the class consisting of alkali and alkaline earth metals, and separating therefrom a low molecular weight normally liquid open–chain monoolefin hydrocarbon containing less than 10 carbon atoms.

2. A process for the inter-condensation of at least two different normally gaseous open-chain monoolefin hydrocarbons into low molecular weight normally liquid open-chain monoolefin hydrocarbons containing less than 10 carbon atoms which comprises heating two different normally gaseous open-chain monoolefin hydrocarbons at a temperature between 275° and 400° C., under a pressure between 400 and 1000 atms. in the presence of an alkali metal catalyst, and separating therefrom a low molecular weight normally liquid open-chain monoolefin hydrocarbon containing less than 10 carbon atoms.

3. A process as set forth in claim 1 in which said catalyst is metallic sodium.

4. A process as set forth in claim 1 in which said catalyst is metallic potassium.

5. A process for the inter-condensation of ethylene and at least on other normally gaseous open-chain monoolefin hydrocarbon into low molecular weight normally liquid open-chain monoolefin hydrocarbons containing less than 10 carbon atoms which comprises heating ethylene and said other normally gaseous open-chain monoolefin hydrocarbons at a temperature of between 275° and 400° C. under a pressure between 250 and 1000 atms. in the presence of an alkali metal catalyst, and separating therefrom a low molecular weight normally liquid open-chain monoolefin hydrocarbon containing less than 10 carbon atoms.

6. A process for the inter-condensation of ethylene and propylene into low molecular weight normally liquid open-chain monoolefin hydrocarbons containing less than 10 carbon atoms which comprises heating ethylene and propylene at a temperature between 300° and 400° C., under a pressure of 400 to 1000 atms. in the presence of a metallic sodium catalyst, and separating therefrom pentene.

7. A process for the inter-condensation of iso- butylene and one other normally gaseous open-chain monoolefin hydrocarbon into low molecular weight normally liquid open-chain monoolefin hydrocarbons containing less than 10 carbon atoms which comprises heating isobutylene and said other normally gaseous open-chain monoolefin hydrocarbons at a temperature of between 275° and 400° C., under a pressure of between 250 and 1000 atms. in the presence of an alkali metal catalyst, and separating therefrom a low molecular weight normally liquid open-chain monoolefin hydrocarbon containing less than 10 carbon atoms.

WILLIAM V. FREED.

REFERENCES CITED

The following references are of record in the file of this patent:

UNITED STATES PATENTS

| Number | Name | Date |
| --- | --- | --- |
| 2,181,640 | Deanesly et al. | Nov. 28, 1939 |
| 2,355,925 | Reid | Aug. 15, 1944 |
| 2,380,358 | Anderson et al. | July 10, 1945 |
| 2,395,381 | Squires | Feb. 19, 1946 |
| 2,405,950 | Hanford | Aug. 20, 1946 |